(12) United States Patent
Ramteke

(10) Patent No.: US 10,529,032 B2
(45) Date of Patent: Jan. 7, 2020

(54) SYSTEM AND METHOD FOR NETWORKING OF PEOPLE SOCIALLY AND PROFESSIONALLY VIA SPECIFIC NESTED CATEGORIES FILTERS UNDER SINGLE NETWORKING PLATFORM

(71) Applicant: Parag Ramteke, Katy, TX (US)

(72) Inventor: Parag Ramteke, Katy, TX (US)

(*) Notice: Subject to any disclaimer, the term of this patent is extended or adjusted under 35 U.S.C. 154(b) by 354 days.

(21) Appl. No.: 15/304,318

(22) PCT Filed: Apr. 15, 2015

(86) PCT No.: PCT/US2015/026044
§ 371 (c)(1),
(2) Date: Oct. 14, 2016

(87) PCT Pub. No.: WO2015/161004
PCT Pub. Date: Oct. 22, 2015

(65) Prior Publication Data
US 2017/0046796 A1    Feb. 16, 2017

Related U.S. Application Data

(60) Provisional application No. 61/979,521, filed on Apr. 15, 2014.

(51) Int. Cl.
*G06Q 50/00* (2012.01)
*H04L 29/08* (2006.01)

(52) U.S. Cl.
CPC ......... *G06Q 50/01* (2013.01); *H04L 67/306* (2013.01)

(58) Field of Classification Search
CPC .................. G06Q 50/01; H04L 67/308
See application file for complete search history.

(56) References Cited

U.S. PATENT DOCUMENTS 8,521,817 B2 * 8/2013 Ryan .................. G06Q 50/01
                                                 709/204
9,116,654 B1 * 8/2015 Shah ..................... G06F 3/14
(Continued)

FOREIGN PATENT DOCUMENTS

WO    WO-2013040088 A1 *  3/2013  ............... G09B 7/02

OTHER PUBLICATIONS

Shukla, R., Silakari, S., & Chande, P. K. (2013). Web personalization systems and web usage mining: A review. International Journal of Computer Applications, 72(21), n/a. doi:http://dx.doi.org/10.5120/12664-9264 (Year: 2013).*

*Primary Examiner* — Amanda C Abrahamson
(74) *Attorney, Agent, or Firm* — Mark M. Friedman

(57) ABSTRACT

A system for providing social and professional networking, wherein said system comprises:
a hardware processor, and
executable software stored on a computer readable medium, wherein said executable software comprises:
  a professional module,
  a social module,
  a professional nested level category filter comprising at least two levels,
  a social nested level category filter comprising at least two levels, and
  a database management system;
wherein said professional module is connected to said professional nested level category filter comprising at least two levels;
wherein said social module is connected to said social nested level category filter comprising at least two levels;
wherein said professional nested level category filter comprising at least two levels is connected to said database management system; and
(Continued)

wherein said social nested level category filter comprising at least two levels is connected to said database management system.

5 Claims, 6 Drawing Sheets

(56) References Cited

U.S. PATENT DOCUMENTS

| | | | |
|---|---|---|---|
| 2008/0221964 A1* | 9/2008 | Berkovitz | G06Q 10/06311 705/80 |
| 2009/0165082 A1* | 6/2009 | Adebiyi | G06F 21/40 726/1 |
| 2010/0132049 A1* | 5/2010 | Vernal | G06F 21/6245 726/27 |
| 2011/0153740 A1* | 6/2011 | Smith | H04L 67/20 709/204 |
| 2012/0110515 A1* | 5/2012 | Abramoff | G06F 16/904 715/854 |
| 2012/0144316 A1* | 6/2012 | Deng | G06Q 30/02 715/751 |
| 2012/0278725 A1* | 11/2012 | Gordon | H04N 21/2665 715/738 |
| 2012/0311462 A1* | 12/2012 | Devecka | H04W 4/21 715/753 |
| 2013/0254308 A1* | 9/2013 | Rose | H04N 21/252 709/206 |
| 2014/0025595 A1* | 1/2014 | Brikman | G06Q 50/01 705/319 |

* cited by examiner

SYSTEM AND METHOD FOR NETWORKING OF PEOPLE SOCIALLY AND PROFESSIONALLY VIA SPECIFIC NESTED CATEGORIES FILTERS UNDER SINGLE NETWORKING PLATFORM

FIELD

The present invention relates to a system and method for networking of people socially and professionally under a single networking platform. A platform in accordance with the present invention can help people in both professional and social networking via categorized industry sectors related to but not limited to companies; organizations; small businesses and industrial products and services; school, colleges, universities and educational institutions; professional and social groups and teams.

BACKGROUND

In conventional online social and professional networks, users connect to each other randomly without an organized group of disciplines, expertise, interests, or experience and without specified industry and small business categories. This creates a network of people in which a user is automatically connected with different users without any distinction between professional and social content. This makes it difficult for a user to organize his professional and social interests and sustain discrete social and professional networking at the same time. These social and professional networking methods and systems do not provide a learning platform database for professional development wherein users can share knowledge, expertise and experience. Students often get involved in random groups without organized industry categories, and these random groups do not help them connect to the right professionals and industries. The existing social and professional networking methods and systems do not provide training facilities to users for professional or personal development.

An embodiment of the present invention comprises a method and system of networking socially and professionally based on categorized industrial sectors. An embodiment can facilitate building unique professional and social user profile; discovering social and professional connections; organizing information socially and professionally via categorized industrial sectors; sharing ideas, asking questions and getting answers; creating and organizing events; creating and accessing training courses under a training center, claiming professional development hours and requesting lunch and learn sessions; creating and sharing "101" pages and content; exploring schools, colleges, universities and other educational institutions; exploring industries, small businesses, and related organizations; creating academic, industrial, professional and social projects and submitting bids and proposals; creating fundraising, academic, and social projects; accessing and submitting products and services; writing articles and blogs and sharing news; chatting online with connections; conducting and accessing webinars and webcasts; following people, pages, groups, and teams; creating groups, forums, and events; stay connected and build the team to discover ideas, execute a project, and work together to achieve the target.

Social networking platforms and professional networking platforms exist aimed toward either social networking or professional networking of people but not both on single platform. Thus, while social networking platforms and professional networking platforms, including Facebook, Yammer, LinkedIn, MySpace, Twitter, and the like exist, and enterprise-specific networking, and some social networking sites, such as Facebook, provide a either social or professional networking platform, it becomes very difficult to maintain both professional and social user profiles under such a networking platform. Moreover, such networking platforms do not provide content, newsfeeds, and posts of user specific interest in an organized manner and with filtered categories.

The need to maintain content, newsfeed and posts relevant to user's specific interest or particular industry, professional or social categories or sector is important for effective networking of people either socially or professionally. An embodiment of the present invention can help a user to organize, maintain and build his both social and professional profile under single networking platform; organize content, newsfeed and posts to user's interests under organized system of filtered professional, social, industry and consumer market categories and sectors.

SUMMARY

An embodiment can comprise a system for providing social and business networking, wherein the system comprises:
a hardware processor, and
executable software stored on a computer readable medium,
wherein the executable software comprises:
a professional module,
a social module,
a professional nested level category filter comprising at least two levels,
a social nested level category filter comprising at least two levels, and
a database management system;
wherein the professional module is connected to the professional nested level category filter comprising at least two levels;
wherein the social module is connected to said social nested level category filter comprising at least two levels;
wherein the professional nested level category filter comprising at least two levels is connected to the database management system; and
wherein the social nested level category filter comprising at least two levels is connected to the database management system.

BRIEF DESCRIPTION OF THE DRAWINGS

The accompanying drawings illustrate embodiments of the invention. In the drawings.

DETAILED DESCRIPTION OF THE EMBODIMENTS

Figure 1:
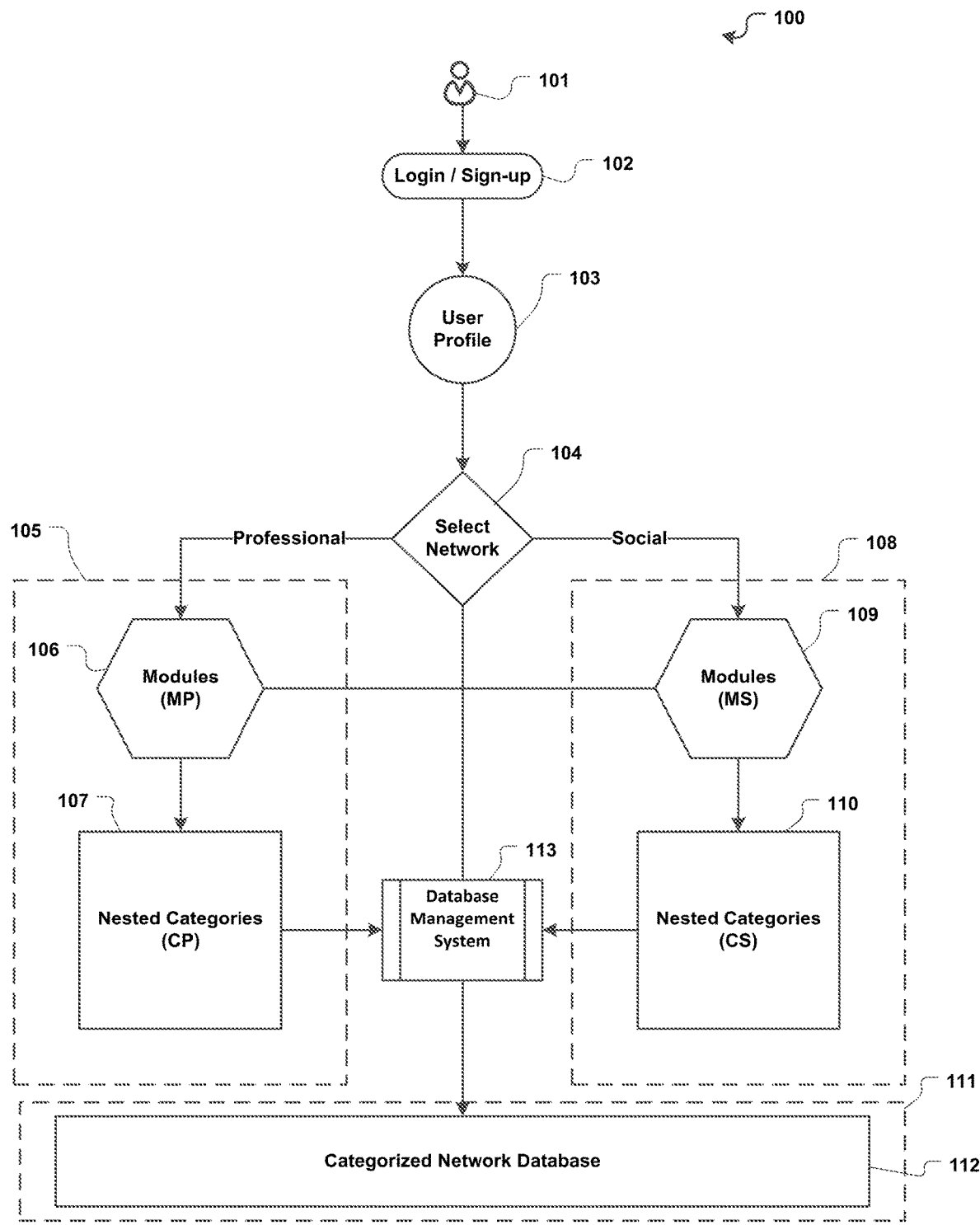
FIG. 1 is a schematic view of a system and method depicting the process of networking people socially and professionally via categorized industrial sectors under single networking platform.

A system and a method incorporating an algorithm and program of instructions for controlling a computer to perform the method and thus providing the system for professional and social networking of people under single platform are described with reference to the Figures.

However, those skilled in the art will readily appreciate that the detailed description given herein with respect to these figures is for explanatory purposes as the invention extends beyond these limited embodiments. For example, it must be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

To achieve the forgoing and other objectives and in accordance with the purpose of the present invention, a system and method for networking of people socially and professionally via specific nested category filters under single networking platform is presented. It is to be understood that the present invention is not limited to the particular methodology, system, techniques, uses, and applications, described herein, as these may vary. It is to be understood that the terminology used herein is used for the purpose of describing particular embodiments only, and is not intended to limit the scope of the present invention.

The present invention is illustrated by way of example, and not by way of limitation, in the figures of the accompanying drawings and in which like reference numerals refer to similar elements.

As shown in the exemplary drawings for purpose of illustration, the present disclosure for a system and a method of networking people both socially and professionally under single platform is generally disclosed in the flow chart of FIG. 1.

FIG. 1 shows a schematic view of networking platform 100 for a professional and social network in accordance with an embodiment. Networking platform 100 receives login input from a user 101 and upon initial log-on 102 displays the user profile 103 comprising a customized view of newsfeed, content, and posts per user's 101 professional 105 and social 108 networking interests. If user 101 signs up 102 initially on the networking platform 100 then the system 100 takes him to build his user profile 103 using the enhanced algorithm in the frontend and backend of the system 100 based on his 101 networking interests 105,108 as input by the user 101.

In an embodiment, the user profile 103 comprises discrete professional 105 and social 108 networking interests and 106, 109 modules. The user profile 103 provides a front end portal to access and create content and posts via discrete modules 106, 109 of professional 105 and social 108 networks. The modules 106, 109 of both professional 105 and social 108 networking platform are integrated with submodules on backend of user profile 103.

In an embodiment, user 101 can switch or select 104 between professional network 105 and social network 108 which are integrated with modules 106, 109 and its submodules in the back-end and front end portal.

In an embodiment, the algorithm developed for networking 100 uses user specific interests 105, 108 to target posts, newsfeed and content via various modules 106, 109 of network.

In an embodiment, user 101 can create, post, access, or browse content and feature modules 106, 109 via nested three level category filters 107, 110 which are unique to each network 105,108.

In an embodiment, nested three level category filters 107, 110 keep the newsfeed, posts, content and the overall networking database organized for each professional network 105 and social network 108.

In an embodiment, a user 101 needs to go through nested level category filters 107, 110 of the system 100 in order to create, access, or browse the content comprising newsfeeds, posts, or files of the respective network 105,108.

In an embodiment, each network's 105,108 categories are integrated and organized in a database management system 113. Database management system 113 then sorts and organizes the data of both the networks 105,108 and integrates them via system algorithm 111 which builds up the categorized network database.

In an embodiment, user 101 can access the respective network database 112 directly using network category filter 107, 110 of that particular network 105, 108.

In an embodiment, user 101 can switch or select between a professional network and a social network for accessing the newsfeed, posts or content that particular network 105, 108.

In an embodiment, a system for providing social and business networking comprises:

a hardware processor, executable software stored on a computer readable medium, wherein said executable software comprises: a professional module, a social module, a professional nested level category filter comprising at least two levels, a social nested level category filter comprising at least two levels, and a database management system; wherein said professional module is connected to said professional nested level category filter comprising at least two levels; wherein said social module is connected to said social nested level category filter comprising at least two levels; wherein said professional nested level category filter comprising at least two levels is connected to said database management system; and wherein said social nested level category filter comprising at least two levels is connected to said database management system.

A similar embodiment could further comprise: a root level that comprises root level category options, and a second level that comprises second level category options; and wherein said social nested level category filter comprising at least two levels comprises a root level that comprises root level category options, and a second level that comprises second level category options.

A similar embodiment could further comprise steps wherein said system:
  receives login input from a user and accesses and displays a user profile associated with said user;
  receives network selection input and connects to said professional module or said social module;
  displays root level nested category options;
  receives root level nested category selection input;
  displays second level nested category options;
  receives second level nested category selection input;
  connects to said database management system and accesses a content category determined by said nested level category selection input.

A similar embodiment could further comprise a step wherein the system displays content from the content category determined by nested level category selection input. The content could comprise newsfeeds, posts, or files. The content could also comprise training content and the system could receive and store training data for verification or certification purposes.

In accordance with an embodiment, a system for providing social and business networking can comprise root level categories that can be expanded and nested in series and in parallel to (n) levels. The system could:
  receive login input from a user and accesses and displays a user profile associated with said user;
  receive network selection input and connects to said professional module or said social module;
  display root level nested category options;
  receive root level nested category selection input;
  display (n) level nested category options;
  receive (n) level nested category selection input; and
  connect to said database management system and accesses a content category determined by said nested level category selection input.

In accordance with an embodiment a system for providing social and business networking could receive input from a user and determine whether a user profile associated with said user exists; and if no user profile exists: prompt user to input user profile data, receive user profile data, and build a user profile. The system could further comprise user profiles stored in a profile category (professional, social, or both), and could connect to the database management system and access a profile category determined by user input. The system could display user profiles from the profile category determined by user input. The system could receive a connection request from a requesting user and transmit the connection request to a requested user, and receive a connection request acceptance from the requested user and form a connection between the requesting user and the requested user.

An embodiment could comprise a method for posting and viewing content on a social and professional network, the method comprising the steps of:

receiving login data comprising username and password;
determining whether user is new, and if user is new, receiving input from user and building new user's profile using front end algorithm and back end algorithm;
receiving input from user that indicates user's professional and social networking interests;
displaying user's profile comprising view of newsfeed, content, and posts based on user's input indicating professional and social networking interests;
receiving input from user selecting social or professional side of network;
receiving input from user selecting nested level category options;
displaying content indicated by user's nested level category selections, and storing content according to user's nested level category selections.

Figure 2:
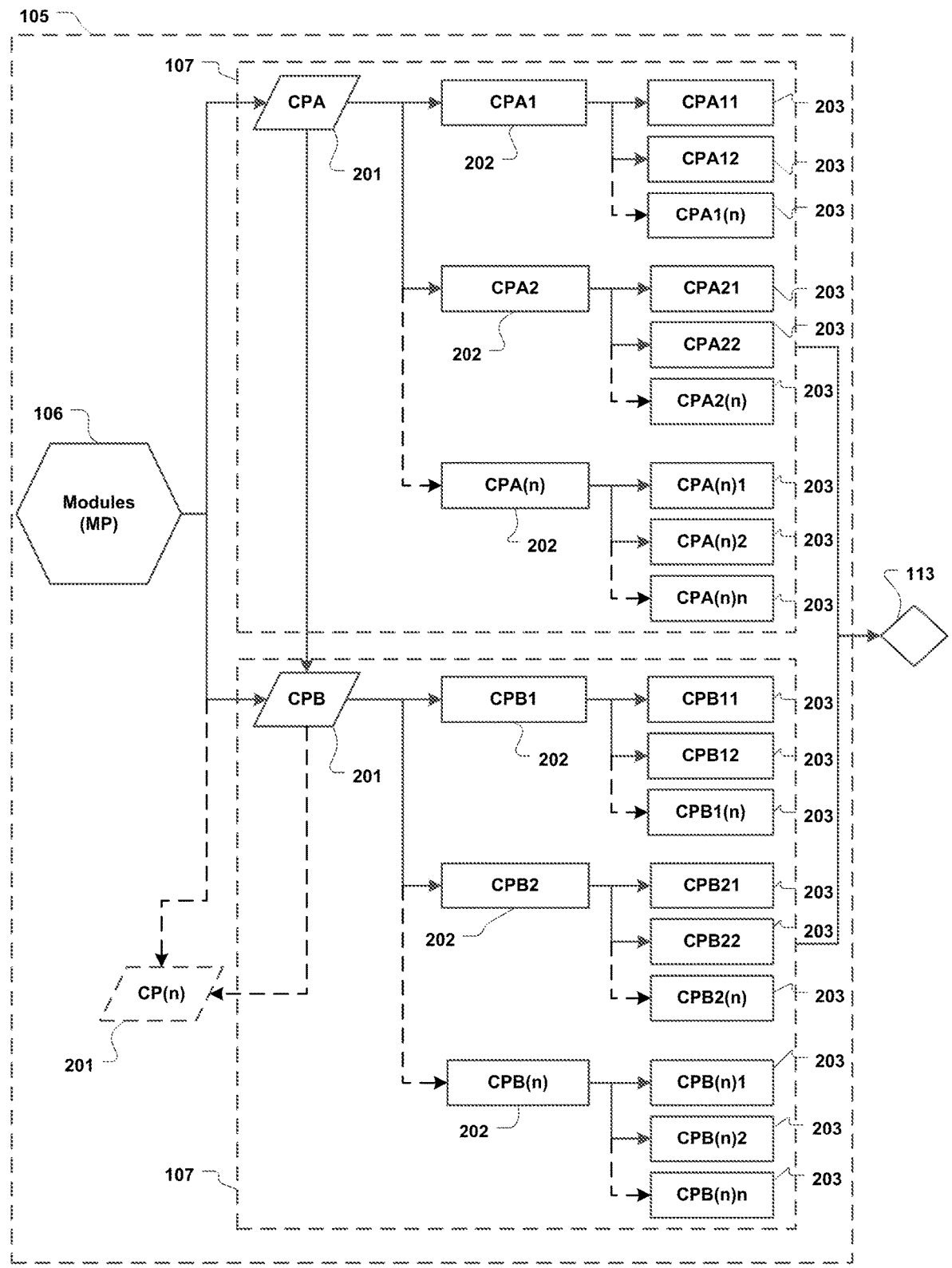
FIG. 2 shows a schematic view of professional network showing integration of modules with nested level scalable categories.

FIG. 2 shows a schematic view of professional network 105 showing integration of modules MP, 106 with nested level categories 107 in accordance with an embodiment. Root categories 201, CP can be both expanded and nested in series and parallel to any 'n' level. FIG. 2 shows the example 107 of three level nested categories of professional network which further can be both expanded and nested from three levels to any 'n' level of categories for that network. Root category 201, CPA can be expanded in series from 202, CPA1 to 203, CPA11 and so on to CPA111(n) level. 203, CPA11 is further nested to 203, CPA12 and so on to 203, CPA1(n). Root category 201, CPA can also be expanded in parallel to 202, CPA1; 202, CPA2 and so on to 202, CPA(n). 202, CPA2 is further expanded to 203, CPA21 and so on to CPA211(n). 203, CPA21 is further nested to 203, CPA22 and so on to 203, CPA2(n). And hence in general, root category 201,CPA can be expanded in parallel 202, CPA(n) level and 202, CPA(n) can further be expanded to CPA(n)1 level. And thus 203, CPA(n)1 level can further be nested in general to 203, CPA(n)2 and so on to 203, CPA(n)n.

In FIG. 2, root category 201, CPB can similarly be expanded and nested as 201, CPA root category in accordance with an embodiment. Root category 201, CPB can be expanded in series from 202, CPB1 to 203, CPB11 and so on to CPB111(n) level. 203, CPB11 is further nested to 203, CPB12 and so on to 203, CPB1(n). Root category 201, CPB can also be expanded in parallel to 202, CPB1; 202, CPB2 and so on to 202, CPB(n). 202, CPB2 is further expanded to 203, CPB21 and so on to CPB211(n). 203, CPB21 is further nested to 203, CPB22 and so on to 203, CPB2(n). And hence in general, root category 201,CPB can be expanded in parallel 202, CPB(n) level and 202, CPB(n) can further be expanded to CPB(n)1 level. And thus 203, CPB(n)1 level can further be nested in general to 203, CPB(n)2 and so on to 203, CPB(n)n.

In FIG. 2, all the categories 107 are then routed to data management system 113 which sorts and organizes the data of the network in accordance with an embodiment.

Figure 3:
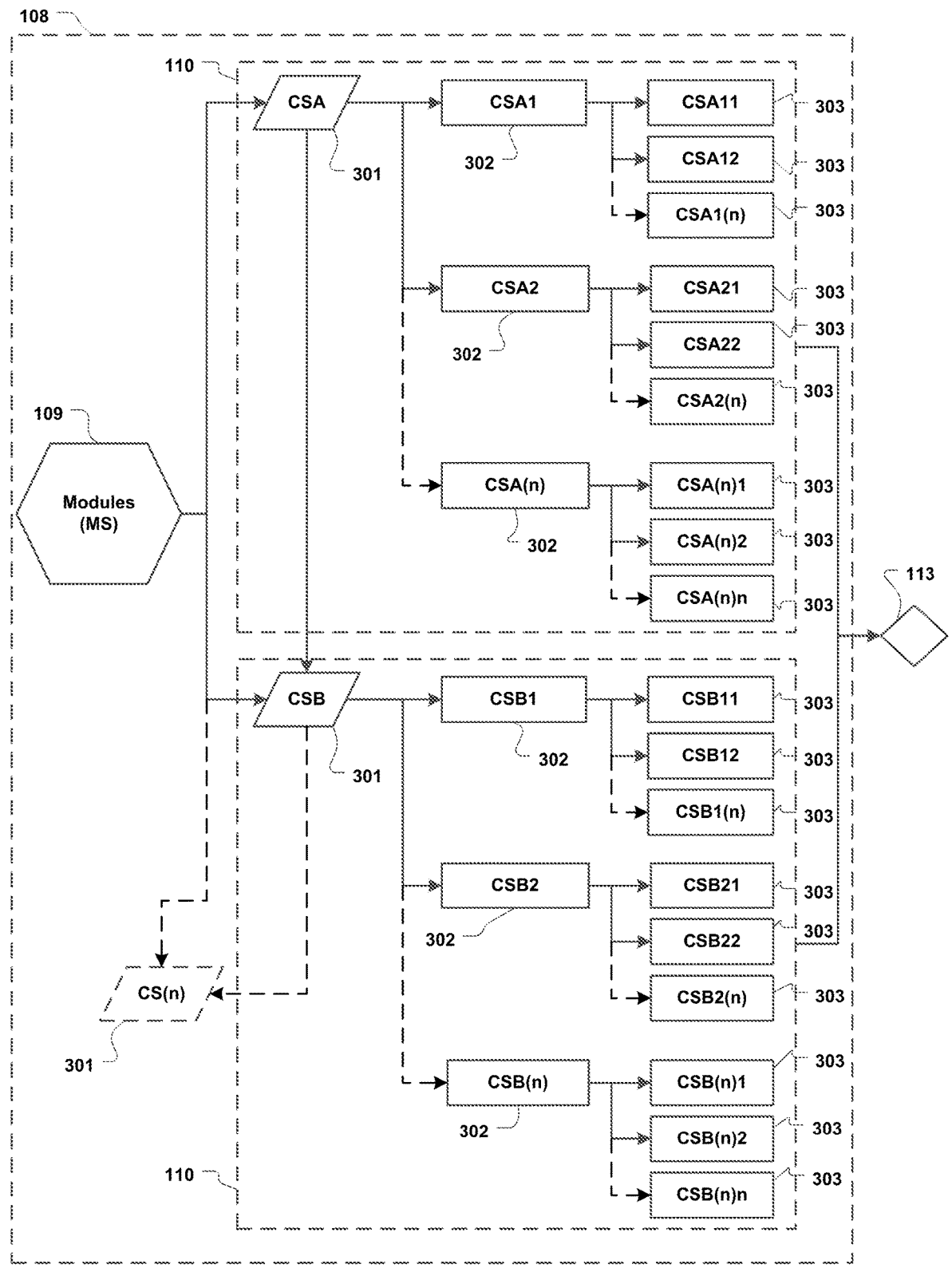
FIG. 3 shows a schematic view of social network showing integration of modules with nested level scalable categories.

FIG. 3 shows a schematic view of social network 108 showing integration of modules MS, 109 with nested level categories 110 in accordance with an embodiment. Root categories 301, CS can be both expanded and nested in series and parallel to any 'n' level. FIG. 3 shows the example 110 of three level nested categories of social network which further can be both expanded and nested from three levels to any 'n' level of categories for that network. Root category 301, CSA can be expanded in series from 302, CSA1 to 303, CSA11 and so on to CSA111(n) level. 303, CSA11 is further nested to 303, CSA12 and so on to 303, CSA1(n). Root category 301, CSA can also be expanded in parallel to 302, CSA1; 302, CSA2 and so on to 302, CSA(n). 302, CSA2 is further expanded to 303, CSA21 and so on to CSA211(n). 303, CSA21 is further nested to 303, CSA22 and so on to 303, CSA2(n). And hence in general, root category 301,CSA can be expanded in parallel 302, CSA(n) level and 302, CSA(n) can further be expanded to CSA(n)1 level. And thus 303, CSA(n)1 level can further be nested in general to 303, CSA(n)2 and so on to 303, CSA(n)n.

In FIG. 3, root category 301, CSB can similarly be expanded and nested as 301, CSA root category in accordance with an embodiment. Root category CSB can be expanded in series from 302, CSB1 to 303, CSB11 and so on to CSB111(n) level. 303, CSB11 is further nested to 303, CSB12 and so on to 303, CSB1(n). Root category 301, CSB can also be expanded in parallel to 302, CSB1; 302, CSB2 and so on to CSB(n). 302, CSB2 is further expanded to 303, CSB21 and so on to CSB211(n). 303, CSB21 is further nested to 303, CSB22 and so on to 303, CSB2(n). And hence in general, root category 301,CSB can be expanded in parallel 302, CSB(n) level and 302, CSB(n) can further be expanded to CSB(n)1 level. And thus 303, CSB(n)1 level can further be nested in general to 303, CSB(n)2 and so on to 303, CSB(n)n.

In FIG. 3, all the categories 110 are then routed to data management system 113 which sorts and organizes the data of the network in accordance with an embodiment.

Figure 4:
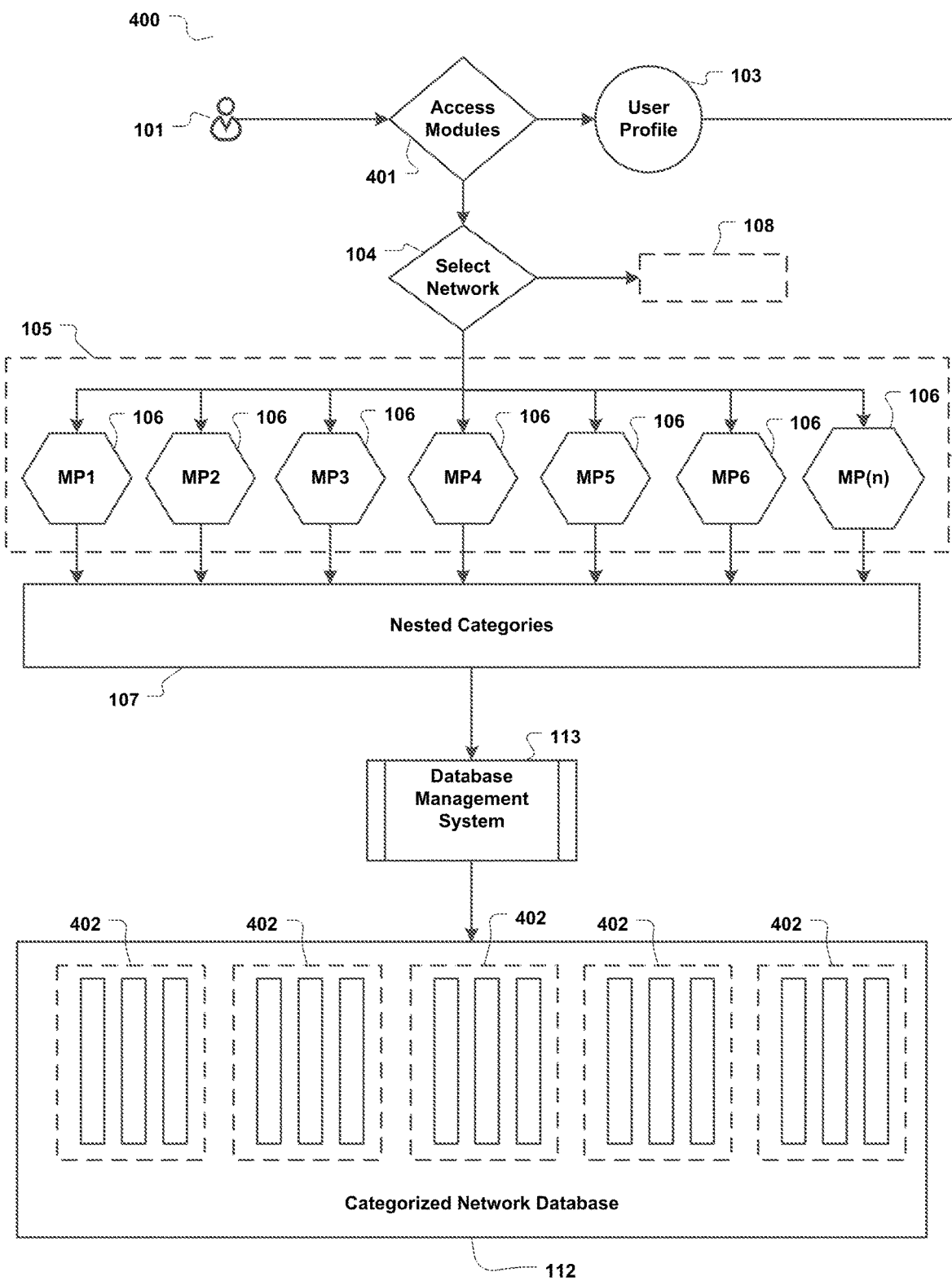
FIG. 4 is a flow chart which illustrates the process of accessing modules of professional network and its integration with user profile.

FIG. 4 is a flow chart 400 which illustrates the process of accessing modules of professional network in accordance with an embodiment. User 101 can access 401 the modules of professional network 105 by visiting his user profile 103 or selecting 104 between professional 105 and social 108 networks. Modules 106 shown in FIG. 4 are an illustration of exemplary various modules 106 MP1, MP2, MP3, MP4, MP5, MP6 and so on which can further be expanded to MP(n) number of modules of professional network. These modules 106 are integrated with user profile 103 as well. Each module 106 is also integrated with nested categories 107 of the network 105. Modules 106, for example, can be used to create content, create posts or create news feed which are further integrated with database management system 113. Database management system 113 further organizes and categorizes the 402 network content, posts and newsfeed, created by using modules 106, into categorized network database 112.

Figure 5:
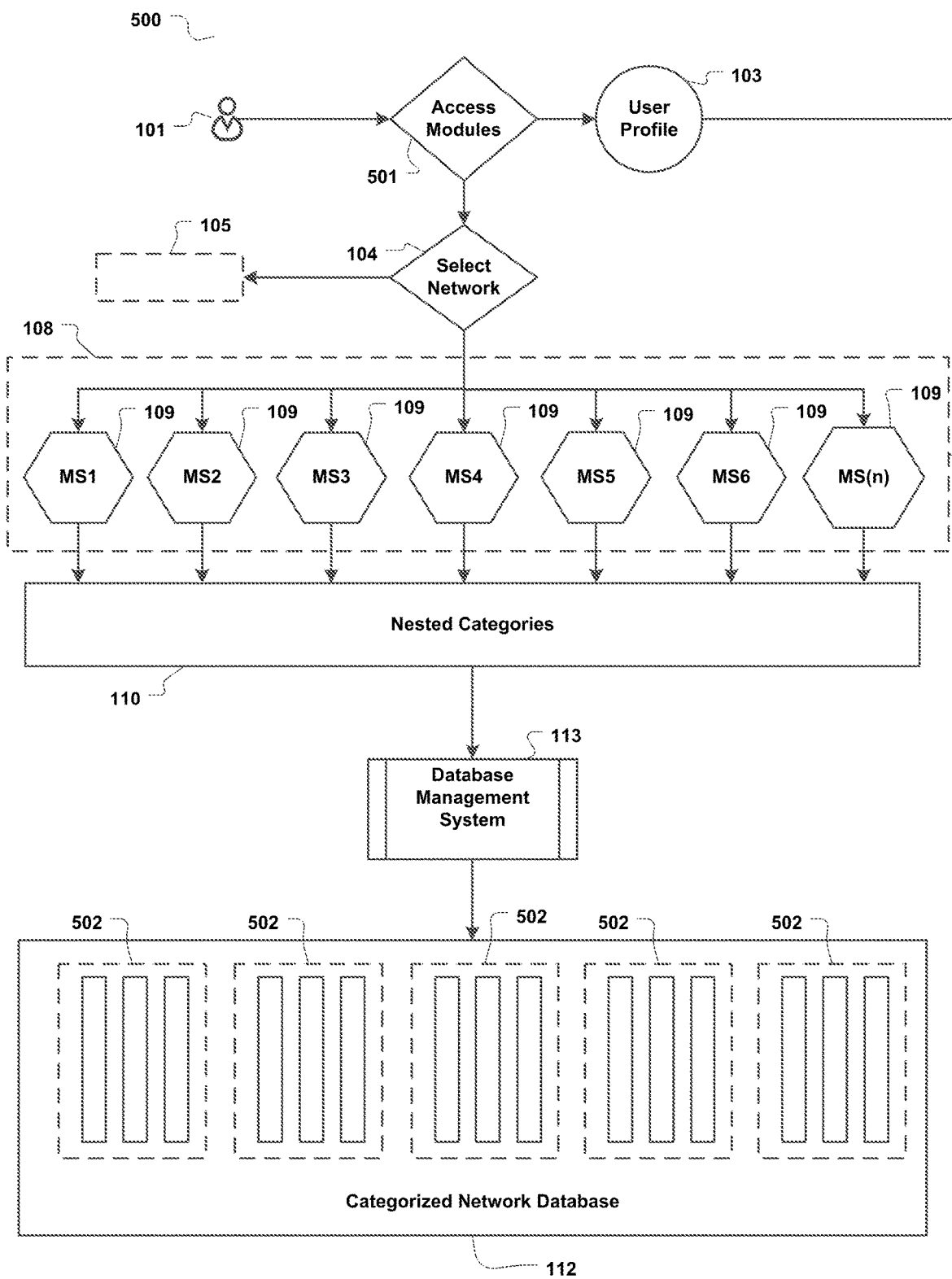
FIG. 5 is a flow chart which illustrates the process of accessing modules of social network and its integration with user profile.

FIG. 5 is a flow chart 500 which illustrates the process of accessing modules of a social network in accordance with an embodiment. User 101 can access 501 the modules of social network 108 by visiting his user profile 103 or selecting 104 between professional 105 and social 108 networks. Modules 109 shown in FIG. 5 are an illustration of exemplary various modules 106 MS1, MS2, MS3, MS4, MS5, MS6 and so on which can further be expanded to MS(n) number of modules of social network. These modules 109 are integrated with user profile 103 as well. Each module 109 is also integrated with nested categories 110 of the network 108. Modules 109, for example, can be used to create content, create posts or create news feed which are further integrated with database management system 113. Database management system 113 further organizes and categorizes the 502 network content, posts and newsfeed, created by using modules 109, into categorized network database 112.

In an embodiment, the professional network 105 and social network 108 is configured with modules 106, 109 including, but not limited to, Groups, Teams, Events, Members Directory, Member invitation, Showcase, Business Directory, Products and Services Directory, Organizations, Projects, 101-Pages, Vault, Vault Share, Training Center having training courses and presentations, Webinars and Webcast, Tools and Calculators, Directory of Universities, School, Colleges and Institutions, Publications having Articles, Blogs, News and Books, Career Center to post and access jobs, Recruiters Directory, Small Business Directory, Classifieds, Social Commerce Stores, Advanced Search, and Chat.

Figure 6:
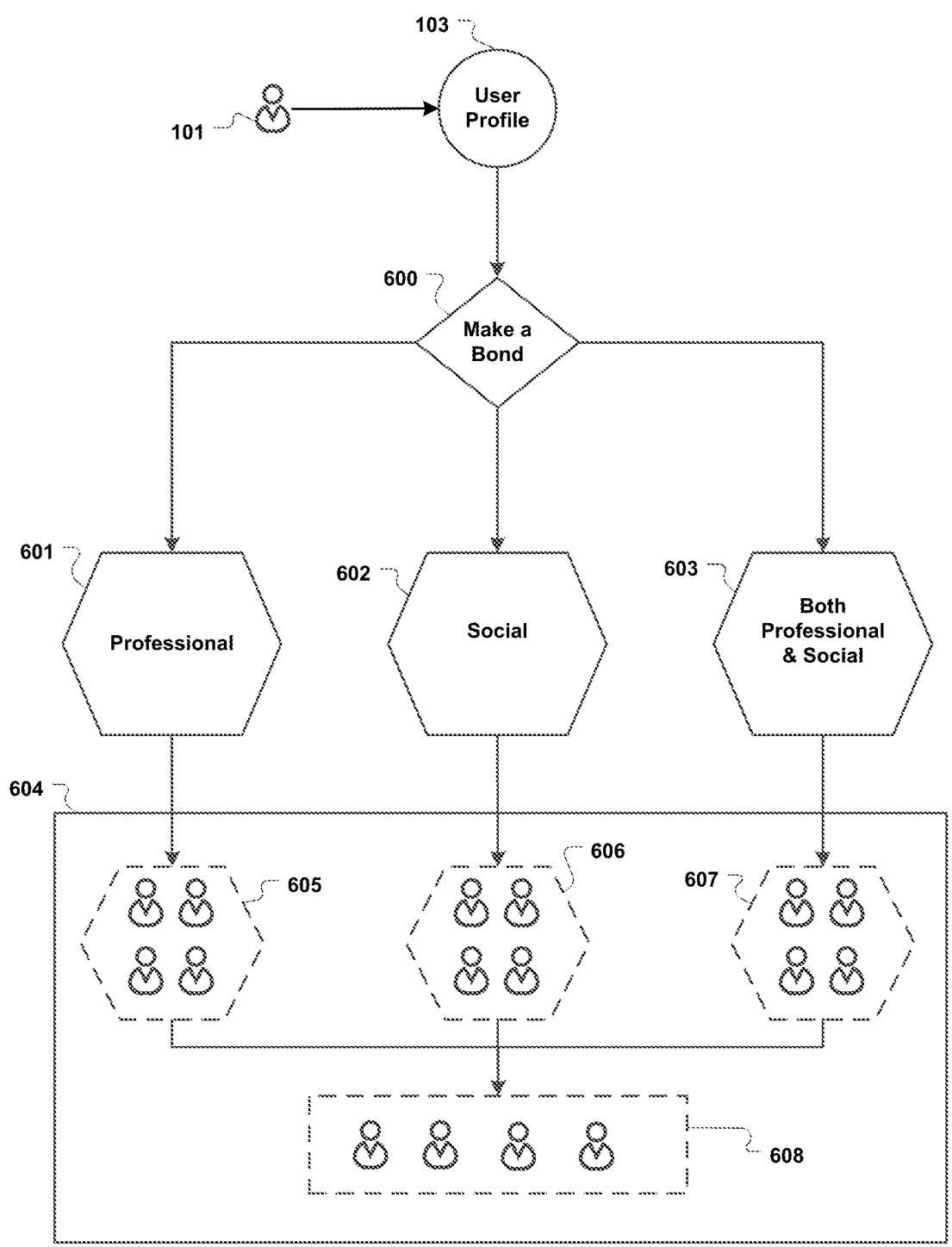
FIG. 6 is an illustration of making specific bonds (connections) with other available users on network.

FIG. 6 is an illustration of making bonds (connections) with other available users on network. When a user 101 accesses the user profile 103 of other available users on network, he can request 600 to make a bond professionally 601, socially 602 or both professionally and socially 603. System with unique algorithm then creates a network 604 of users for user 101 and further organizes the connected users of user 101 into professional bonds (connections) 605, social bonds (connections) 606 and both professional and social bonds (connections) 607. User 101 can further organize these connected users from his network 604 into customized bonds list 608 of specific users. Thus, the user 101 will be able to establish two-way networking bonds (connections) with other users of the network. User profile 103 will have privacy settings which user 101 can customize to manage following user profile 103 system features but not limited to, various integrated modules, professional and social network default interest categories, newsfeed, posts and content.

A method and system of networking people both socially and professionally under single platform based on categorized various industrial sectors is provided. The method and system provides users with a unique platform to maintain both social and professional networking. It is to be understood that the present invention is not limited to the particular methodology, system, techniques, uses, and applications, described herein, as these may vary. It is also to be understood that the terminology used herein is used for the purpose of describing particular embodiments only, and is not intended to limit the scope of the present invention. The method and system can comprise the following features:

a) Building both professional and social profile with discrete interests and maintain both professional and social bonds in an organized manner.
b) Creating groups having forums of special interests.
c) Building customized teams of professionals from various backgrounds, professional team, team for local community, social organization team, sports team, industry, company, or organizational team and educational team.
d) Creating and managing tasks and events.
e) Creating and managing portfolio projects, industrial projects, social projects, academic projects, bid and proposal projects and fundraiser projects.
f) Creating and managing 101 pages for various industrial sectors for mutual learning and knowledge sharing.
g) Creating training courses for educational purposes and business products and services.
h) Requesting lunch and learn sessions for specific training courses and claim professional development hours.
i) Building directory of industry and small businesses.
j) Accessing and submitting jobs.
k) Building directory of school, colleges, universities and educational institutions.
l) Building directory of products and services.
m) Creating webinars and webcasts.
n) Online chatting with professional and social bonds.
o) Sharing content including documents and media files.
p) Writing articles, blogs, and sharing news.
q) Bonding with users as discrete professional and social bonds.
r) Sharing posts with users via discrete system with either public, professional bonds or social bonds.
s) Creating customized profile status headline which can be scheduled for a specific day, or recurring daily, monthly or annually.
t) Creating bonds list to group the professional and social bonds as required.
u) Permitting user to create or submitting the content via three level categories of various industrial sectors thus organizing the content of specific industry distinct to professional and social network.
v) Creating and sharing classifieds.
w) Creating an online store wherein users can sell and buy products and services.

Although several embodiments have been described in detail for purposes of illustration, various modifications may be made without departing the scope and spirit of invention. Accordingly, the invention is not to be limited, except as by the appended claims.

What is claimed is:

1. A computer system for creating an integrated social and professional networking platform, comprising:
   a processor;
   a storage coupled to the processor, the storage for storing a database;
   a utility software program executable on the processor for dynamically creating an integrated social and professional networking platform, the utility software program including
   a professional module;
   a social module;
   a professional nested level category filter;
   a social nested level category filter; and
   a database management system comprising a plurality of content categories;
   wherein
   said professional module is connected to said professional nested level category filter connected to said database management system;
   said social module is connected to said social nested level category filter connected to said database management system;
   each of said professional nested level category filter and said social nested level category filter comprises at least two levels;
   wherein the at least two levels comprises:
   a root level comprising a plurality of root level category options, and
   a second level comprising a plurality of second level category options,
   wherein said computer system is configured to:
   receive login input from a user and access and display a user profile associated with said user;
   receive a network selection input and connect to said professional module or said social module;
   display the plurality of root level nested category options;
   receive root level nested category selection input;
   display the plurality of second level nested category options;
   receive second level nested category selection input;
   connect to said database management system and access a content category determined by said root level nested level category selection input and by said second level nested category selection input;
   display content from said content category determined by root level nested category selection input and by said second level category selection input, said content comprising training content, newsfeeds, posts, files, or content generated using said social module.

2. The computer system for creating an integrated social and professional networking platform of claim 1, wherein said root level categories can be expanded and nested in series and in parallel to any number of levels.

3. A computer implemented method for creating an integrated social and professional networking platform to post and view content on a social and professional network, the computer implemented method comprising:
   receiving, by a computer system comprising at least one computer in a network comprising at least one processor, a login input from a user comprising a username and a password;
   accessing, by said computer system, a user profile associated with a user, the user profile including professional and social networking interests;
   displaying, by said computer system, the user profile comprising a customized view of a newsfeed, a content, and a post per the user's professional and social networking interests;
   determining, by said computer system, whether said user is new, and if said user is new, receiving, by said computer system, an input from said new user that indicates said new user's professional and social networking interests;
   building, by said computer system, a new user's profile based on said input from said new user;
   displaying, by said computer system, said new user's profile; wherein said new user profile comprises:
   a view of said newsfeed;
   said content; and
   a post based on said new user's input indicating professional and social networking interests;
   receiving said input, by said computer system, from said new user selecting social or professional network;
   receiving said input, by said computer system, from said new user selecting nested level category options;
   displaying, by said computer system, a plurality of root level nested category options;
   receiving, by said computer system, a root level nested category selection input from said new user;
   displaying, by said computer system, a plurality of second level nested category options;
   receiving, by said computer system, a second level nested category selection input from said user;
   connecting, by said computer system, to a database management system, said database management system comprising a plurality of content categories;
   accessing, by said computer system, a content category determined by said root level nested category selection input and by said second level category selection input from said new user; and
   displaying, by said computer system, content from said content category determined by root level nested category selection input and by said second level category selection input, said content comprising training content, newsfeeds, posts, files, or content generated using said social module.

4. The computer implemented method claim 3, wherein the computer implemented method further comprises: storing said content according to said user's nested level category selections.

5. The computer implemented method of claim 3, the computer implemented method further comprising: receiving and storing user said inputs to build a plurality of directories, wherein said directories comprise: a directory of industries and small businesses; a directory of jobs listings; a directory of schools, colleges, universities and other educational institutions; and a directory of products and services.

* * * * *